US009288027B2

(12) United States Patent
Zacharias et al.

(10) Patent No.: US 9,288,027 B2
(45) Date of Patent: Mar. 15, 2016

(54) INTERFERENCE MITIGATION THROUGH CARRIER AGGREGATION

(71) Applicant: Broadcom Corporation, Irvine, CA (US)

(72) Inventors: Leena Zacharias, San Jose, CA (US); Stephanie Felicia Pereira, Santa Clara, CA (US); Erik Richard Stauffer, Sunnyvale, CA (US); Kamlesh Rath, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 246 days.

(21) Appl. No.: 13/892,200

(22) Filed: May 10, 2013

(65) Prior Publication Data

US 2014/0307638 A1    Oct. 16, 2014

Related U.S. Application Data

(60) Provisional application No. 61/811,660, filed on Apr. 12, 2013.

(51) Int. Cl.
*H04L 12/26* (2006.01)
*H04L 5/00* (2006.01)

(52) U.S. Cl.
CPC .............. *H04L 5/0053* (2013.01); *H04L 5/001* (2013.01); *H04L 5/0073* (2013.01); *H04L 5/0085* (2013.01); *H04L 5/0098* (2013.01)

(58) Field of Classification Search
USPC .................... 370/241–252, 329–355, 236; 455/440–452
See application file for complete search history.

(56) References Cited

U.S. PATENT DOCUMENTS

| 8,280,389 | B1 * | 10/2012 | Turtinen et al. | 455/450 |
|---|---|---|---|---|
| 8,446,872 | B2 * | 5/2013 | Choi et al. | 370/330 |
| 8,543,129 | B2 * | 9/2013 | Kazmi et al. | 455/452.2 |
| 8,923,877 | B2 * | 12/2014 | Youtz et al. | 455/452.2 |
| 2013/0021996 | A1 * | 1/2013 | Wang et al. | 370/329 |
| 2013/0039331 | A1 * | 2/2013 | Koorapaty et al. | 370/330 |
| 2013/0136015 | A1 * | 5/2013 | Ojala et al. | 370/252 |
| 2013/0258995 | A1 * | 10/2013 | Skov et al. | 370/329 |
| 2013/0308490 | A1 * | 11/2013 | Lim et al. | 370/252 |

OTHER PUBLICATIONS

Bendlin, et al., "Embracing LTE-A with KeyStone SoCs", Oct. 2012, pp. 1-15, Texas Instruments Incorporated.
Pedersen, et al., "Carrier Aggregation for LTE-Advanced: Functionality and Performance Aspects", IEEE Communications Magazine, Jun. 2011, pp. 1-11, vol. 49, Issue 6.

(Continued)

*Primary Examiner* — Man Phan
(74) *Attorney, Agent, or Firm* — McDermott Will & Emery LLP

(57) ABSTRACT

A system for interference mitigation through carrier aggregation may include one or more processors and a memory. The memory may include instructions that, when executed by the one or more processors, cause the one or more processors to: provide data transmissions and control transmissions to a wireless device over a primary component carrier, determine that interference exists on the primary component carrier, and switch at least a portion of the data or control transmissions to a secondary component carrier in response to determining that the interference exists on the primary component carrier, while maintaining connectivity on the primary component carrier.

26 Claims, 6 Drawing Sheets

(56) References Cited

OTHER PUBLICATIONS

Wannstrom, "Carrier Aggregation Explained", retrieved from <www.3gpp.org/Carrier-Aggregation-explained>, May 2012, pp. 1-3, 3GPP.

Garcia, et al., "Autonomous Component Carrier Selection: Interference Management in Local Area Environments for LTE-Advanced", IEEE Communications Magazine, Sep. 2009, pp. 110-116, Femtocell Wireless Communications.

"Carrier Aggregation—(one) Key Enabler for LTE-Advanced", Version 01.01, Oct. 2012, pp. 1-12, Rohde & Schwarz.

* cited by examiner

INTERFERENCE MITIGATION THROUGH CARRIER AGGREGATION

CROSS-REFERENCE TO RELATED APPLICATIONS

The present application claims the benefit of U.S. Provisional Patent Application Ser. No. 61/811,660, entitled "Interference Mitigation Through Carrier Aggregation," filed on Apr. 12, 2013, which is hereby incorporated by reference in its entirety for all purposes.

TECHNICAL FIELD

The present description relates generally to interference mitigation, and more particularly, but not exclusively, to interference mitigation through carrier aggregation.

BACKGROUND

The prevalence of wireless devices that use disparate wireless technologies has led to the airwaves being crowded with wireless signals, e.g., cellular signals, Bluetooth, Wi-Fi signals, and/or other wireless signals. In some instances, a wireless device may simultaneously utilize multiple wireless technologies that may interfere with each other on a temporary, but reoccurring, basis, e.g. due to transmissions on neighboring frequencies. For example, a wireless device may transmit Long Term Evolution (LTE) signals and Bluetooth signals on neighboring frequencies. Accordingly, a wireless device may benefit from one or more mechanisms for tolerating or mitigating interfering signals, e.g. from collocated radios. For example, a wireless device may utilize filtering technology to suppress interfering signals; however, filtering technology may be costly in some instances. A wireless device may also utilize a handover procedure to switch from a frequency experiencing interference to a frequency that is not experiencing interference; however, there may be latencies associated with handover procedures that may be undesirable when mitigating temporary, but reoccurring, interference.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
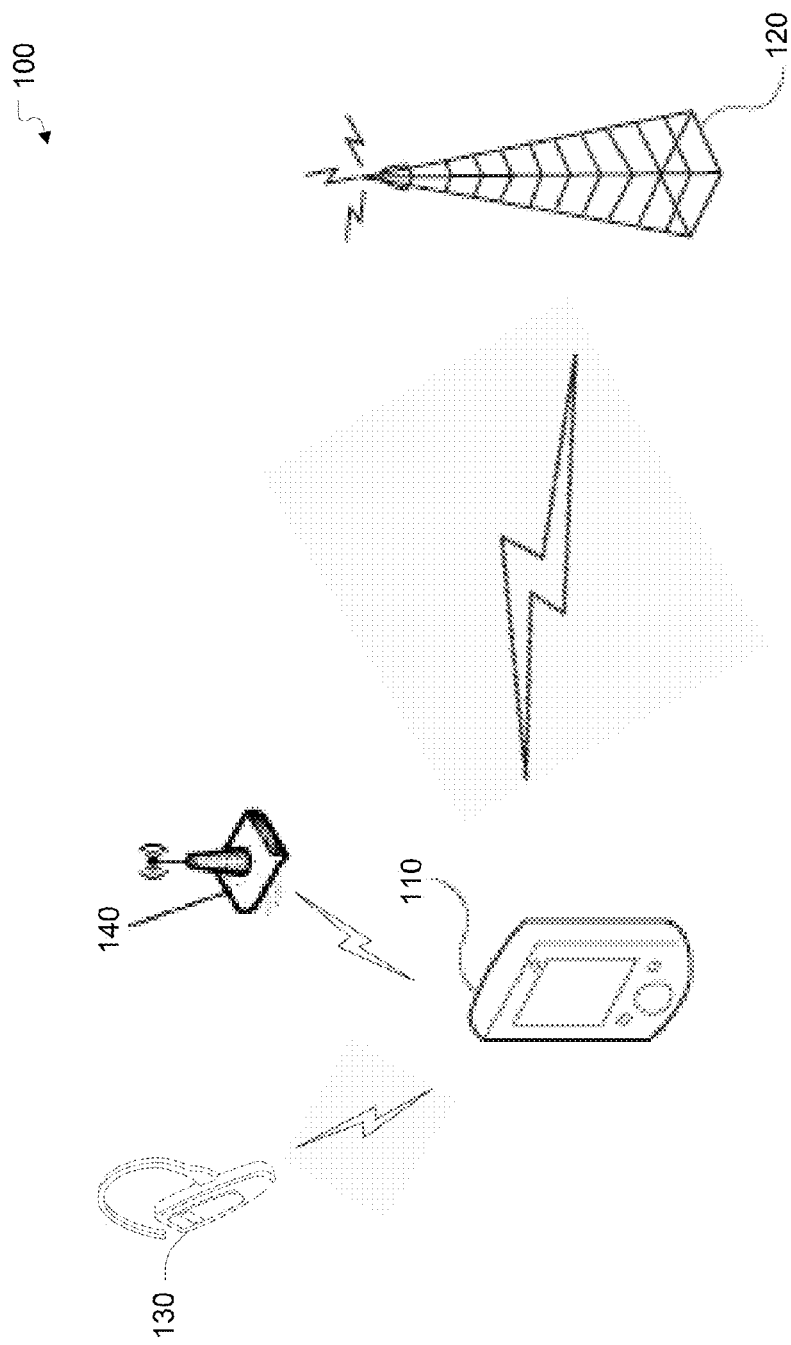
FIG. 1 illustrates an example wireless network environment in which a system for interference mitigation through carrier aggregation may be implemented in accordance with one or more implementations.

FIG. 1 illustrates an example network environment 100 in which a system for interference mitigation through carrier aggregation may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a user device 110, a base station 120, and electronic devices 130, 140. The user device 110 may include, may be a component of, and/or may be referred to in one or more implementations as, as User Equipment (UE). The user device 110 may include suitable logic, circuitry, interfaces, memory, and/or code that enables communications, e.g. with the base station 120, and/or the electronic devices 130, 140, via wireless interfaces and utilizing one or more radio transceivers. In one or more implementations, the user device 110 may be, or may include, a mobile phone, a personal digital assistant (PDA), a tablet device, a computer, or generally any device that is operable to communicate wirelessly with the base station 120 and/or one or more of the electronic devices 130, 140. In one or more implementations, the user device 110 may be, or may include one or more components of, the system discussed below with respect to FIG. 6.

The base station 120 may include, may be a component of, and/or may be referred to in one or more implementations as, a Node B (NB) or an Evolved NodeB (eNodeB or eNB). The base station 120 may include suitable logic, circuitry, interfaces, memory, and/or code that enables communications, e.g. with the user device 110, via wireless interfaces and utilizing one or more radio transceivers. The base station 120 may be a base station of a cellular-based wireless network, such as an LTE communications network, or generally any cellular-based communications network. In one or more implementations, the base station 120 may be, or may include one or more components of, the system discussed below with respect to FIG. 6.

The user device 110 and the base station 120 may communicate using carrier aggregation, which allows the user device 110 and the base station 120 to simultaneously transmit data and/or control information over multiple aggregated carriers. The aggregated carriers may be individually referred to as component carriers. For example, a primary component carrier may be utilized by the user device 110 and the base station 120 for data and control transmissions while one or more secondary component carriers can be dynamically configured and activated by the base station 120 on-demand, e.g. to increase bandwidth. In one or more implementations, the secondary component carriers may be implemented through the base station 120, e.g. without requiring any backhaul network communications, or the secondary component carriers may be implemented across multiple base stations, e.g. using backhaul network communications.

In one or more implementations, the carrier aggregation can be used in Time Division Duplex (TDD) systems or Frequency Division Duplex (FDD) systems. The component carriers may be contiguous carriers, e.g. within the same frequency band or within neighboring frequency bands, or the component carriers may be non-contiguous, e.g. within the same frequency band with one or more gaps in-between, or across multiple non-contiguous frequency bands. The component carriers may have the same bandwidth, or may have differing bandwidths. In FDD systems the number of component carriers may differ between the uplink and the downlink; however, in TDD systems the number of component carriers for the uplink and the downlink may be the same. The base station 120 may allocate resources to the user device 110 over any of the individual component carriers.

In one or more implementations, the component carriers may be associated with different serving cells; however, the radio resource control (RRC) connection may be handled by the primary serving cell that is served by the primary component carrier, e.g. in the downlink and uplink. The user device 110 may also receive non-access stratum (NAS) information, such as security parameters, and/or other system information, on the primary component carrier, e.g. in the downlink. Information pertaining to the physical uplink control channel (e.g. LTE PUCCH) may also be sent over the primary component carrier, e.g. in the uplink. Thus, the primary component carrier may generally be utilized for data and control transmissions, while the secondary component carriers may generally be utilized to provide additional bandwidth for data transmissions.

In one or more implementations, the base station 120 may communicate configuration information regarding one or more secondary component carriers, e.g. being utilized by the base station 120, to the user device 110. Upon receiving the configuration information, the user device 110 can configure the secondary component carriers. The user device 110 may then be able to activate configured component carriers. The resources of the configured secondary component carriers can be scheduled for carrier aggregation as needed. The secondary component carrier configuration information transmitted by the base station 120 can include radio layer information for the uplink and downlink for each secondary component carrier. For example, the configuration information can include details regarding the uplink and downlink component carriers' center frequency, bandwidth, duplex mode, and base station 120 specific carrier index. The duplex mode may be time division duplex (TDD) or frequency division duplex (FDD). In addition, the duplex mode may be different between the primary component carrier and one or more secondary component carriers.

After a secondary component carrier has been configured, the configured secondary component carrier can generally only be used for periodic measurements. In order for the configured secondary component carrier to be used for data transmissions, the configured secondary component carrier should be activated. For example, the base station 120 may transmit activation information to the user device 110. The activation information can include a list of configured secondary component carriers to be activated and/or a list of activated secondary component carriers to be deactivated. The user device 110 may receive the activation information and may activate secondary component carriers, and/or deactivate configured secondary component carriers, as appropriate. In one or more implementations, an activated secondary component carrier may also be deactivated implicitly after no data is scheduled on that carrier for a predefined period of time that may be set during configuration/activation.

The electronic device 130 is illustrated in FIG. 1 as a Bluetooth device, such as a Bluetooth headset, and the electronic device 140 is illustrated in FIG. 1 as a wireless access device, such as a Wi-Fi access point. Although the electronic devices 130, 140 are illustrated as Bluetooth and Wi-Fi devices, the electronic devices 130, 140 are not limited to devices that communicate via Bluetooth and/or Wi-Fi communications. In one or more implementations, the electronic device 130 and/or the electronic device 140 may include cellular communication capabilities, e.g. the electronic devices 130, 140 may be LTE capable devices. The electronic devices 130, 140 may be any device that is capable of communicating with the user device 110 and/or the base station 120 using any wireless communication specification or standard.

In one or more implementations, the user device 110 may communicate with the base station 120 according to a first communications specification or standard (e.g., a first type of wireless communication that uses a first frequency band), the user device 110 communicates with the electronic device 130 according to a second communications specification or standard (e.g., a second type of wireless communication that uses a second frequency band), and the user device 110 communicates with the electronic device 140 according to a third communications specification or standard (e.g., a third type of wireless communication that uses a third frequency band). The user device 110 may include one or more radios for enabling communication over the different communication specifications. For example, the user device 110 may include a cellular radio module that enables cellular communications with the base station 120, a Bluetooth radio module that enables Bluetooth communications with the electronic device 130, and a Wi-Fi radio module that enables Wi-Fi communications with the electronic device 140. In one or more implementations, one or more of the modules may be combined into a single module, e.g. the Bluetooth and Wi-Fi radio modules may be combined into a Bluetooth/Wi-Fi radio module.

In one or more implementations, concurrent communications by the user device 110 in accordance with the first, second and/or third communications specifications may interfere with each other, such as when the concurrent communications are over neighboring frequencies. The interference between the concurrent communications may lead to packet loss and/or to the user device 110 becoming disassociated with the base station 120, the electronic device 130, and/or the electronic device 140. For example, the user device 110 may communicate with the base station 120 using LTE frequency band 40, e.g. 2390 megahertz (MHz), while communicating with the electronic device 140 over Wi-Fi channel 1, e.g. 2412 Mhz. Since the user device 110 is concurrently communicating with the base station 120 and the electronic device 130 over neighboring frequencies, the communications may interfere with one another. An example frequency allocation is discussed further below with respect to FIG. 5.

In operation, if the user device 110 and the base station 120 support carrier aggregation, and the user device 110 or the base station 120 determines that the primary component carrier is experiencing, and/or is causing, interference, at least a portion of the data or control transmissions on the primary component carrier can be moved to a secondary component carrier in order to mitigate the interference being experienced, and/or caused, by the primary component carrier. In one or more implementations, at least a portion of the data transmissions and at least a portion of the control transmissions on the primary component carrier may be moved to a secondary component carrier. Example processes for mitigating interference through carrier aggregation are discussed further below with respect to FIGS. 2-4.

Figure 2:
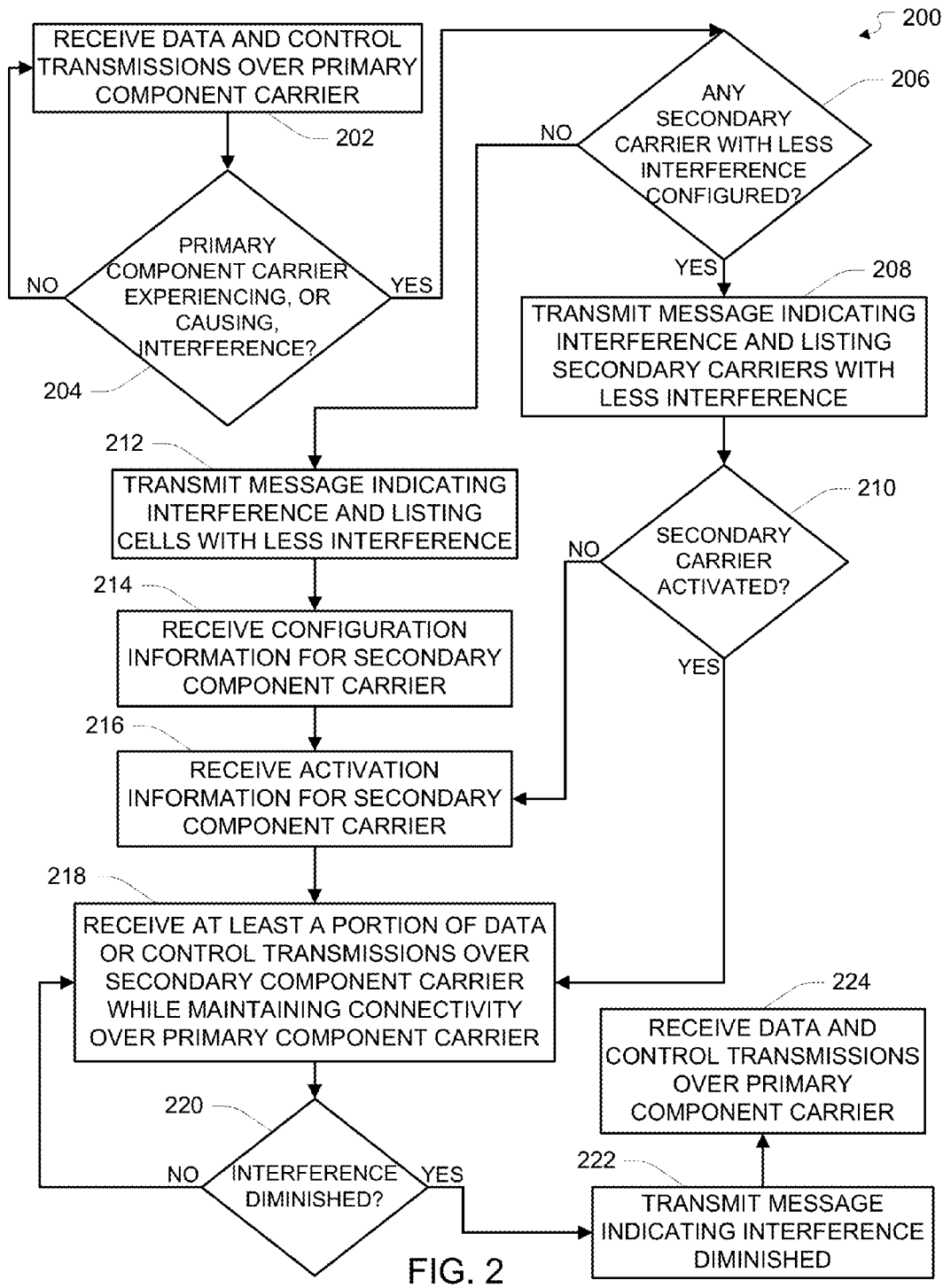
FIG. 2 illustrates a flow diagram of an example process of a user device in a system for interference mitigation through carrier aggregation in accordance with one or more implementations.

FIG. 2 illustrates a flow diagram of an example process 200 of a user device 110 in a system for interference mitigation through carrier aggregation in accordance with one or more implementations. For explanatory purposes, example process 200 is described herein with reference to the user device 110 of the example network environment 100 of FIG. 1; however, example process 200 is not limited to the user device 110 of the example network environment 100 of FIG. 1, and the example process 200 may be performed by one or more components of the user device 110, such as a host processor and/or a cellular radio module. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

The user device 110, or a component thereof such as a cellular radio module, receives data and control transmissions over a primary component carrier (202). The user device 110 determines whether the primary component carrier is experiencing, and/or is causing, interference (204). For example, the user device 110 may determine one or more signal quality metrics for the transmissions received over the primary component carrier (202), and the user device 110 may determine, based on the signal quality metrics, whether the primary component carrier is experiencing interference. The signal quality metrics may include, e.g., a received signal strength indication (RSSI), a signal-to-interference-plus-noise ratio (SINR), a packet-delivery ratio (PDR), a bit-error rate (BER), or generally any metric that may indicative of signal quality and/or of signal interference. In one or more implementations, the user device 110 may receive an indication from a radio module that is collocated with the cellular radio module, such as a Bluetooth radio module, a Wi-Fi radio module, or generally any collocated radio module, that indicates that the primary component carrier is causing interference with respect to the communications of the collocated radio.

If the user device 110 determines that the primary component carrier is not experiencing, and/or causing, interference (204), the user device 110 continues to receive data and control transmissions over the primary component carrier (202). If the user device 110 determines that the primary component carrier is experiencing, and/or causing, interference (204), the user device 110 determines whether there are any configured secondary carriers that are experiencing, and/or causing less interference than the primary component carrier (206). If the user device 110 determines that there is a configured secondary carrier that is experiencing, and/or causing, less interference than the primary component carrier (206), the user device 110 transmits a message to the base station 120 that indicates that the primary component carrier is experiencing, and/or is causing, interference (208). The message may include a list of one or more configured secondary component carriers that are experiencing, and/or causing, less interference than the primary component carrier.

In one or more implementations, the message may include information that may assist the base station 120 with determining an appropriate secondary component carrier to utilize for at least a portion of the data or control transmissions of the primary component carrier. The information may include, e.g., one or more measurements that indicate the interference on the primary component carrier, an indication of the technology that is causing the interference, e.g. the Bluetooth radio module, the frequency from which the interference originates, an interference pattern in time, and/or generally any information that may assist the base station 120 with determining an appropriate secondary component carrier to select. In one or more implementations where the interference is due to a collocated radio, such as a Wi-Fi radio, the Wi-Fi radio module may transmit a message to the cellular radio module that indicates the channel that the Wi-Fi radio module is using for transmissions. The cellular radio module may have access to a pre-calculated table of interference between channels of the Wi-Fi and cellular radio modules. The cellular radio module may utilize the channel indicated by the Wi-Fi radio module, and the table, to determine other frequencies on which there will be less interference, e.g. by checking against a threshold. The message from the user device 110 may list one or more secondary component carriers that utilize the determined frequencies on which there will be less interference.

In one or more implementations, instead of transmitting a message to indicate the interference with respect to the primary component carrier, the base station 120 may utilize a channel quality indicator (CQI) that is transmitted by the user device 110 to determine the interference with respect to the primary component carrier. Alternatively, or in addition, the user device 110 may transmit a measurement report to the base station 120 to indicate a bad channel on the primary component carrier.

The base station 120 receives the message from the user device 110 and selects a secondary component carrier, e.g. a secondary component carrier that utilizes a frequency that is sufficiently disparate from the interfering band. In one or more implementations, the base station may select the secondary component carrier based at least in part on the message received from the user device 110, or the base station 120 may select the secondary component carrier irrespective of the message received from the user device 110. If the selected secondary component carrier is not activated (210), the user device 110 receives activation information for the secondary component carrier (216) and the user device 110 activates the secondary component carrier. In one or more implementations, if there is a maximum number of secondary component carriers that can be configured for the user device 110, such as five secondary component carriers, and none of the existing secondary component carriers can sufficiently avoid the interference, one of the secondary component carriers may be de-configured and a new secondary component carrier may be added that can substantially avoid the interference.

If the user device 110 determines that there are no configured secondary carriers that are experiencing, and/or causing, less interference than the primary component carrier (206), the user device 110 transmits a message to the base station 120 that indicates that the primary component carrier is experiencing, and/or causing, interference (212). The message may also include a list of one or more cells with less interference, e.g. for which a secondary component carrier may be configured. In one or more implementations, the message may include information that may assist the base station 120 with determining an appropriate cell for configuring a secondary component carrier. The information may include, e.g., one or more measurements that indicate the interference on the primary component carrier, an indication of the technology that is causing the interference, e.g. the Bluetooth radio module, the frequency from which the interference originates, an interference pattern in time, one or more measurements for the cells listed in the message, and/or generally any information that may assist the base station 120 with determining an appropriate cell for configuring and activating a secondary component carrier.

The base station 120 configures a secondary component carrier, and the user device 110 receives configuration information for the secondary component carrier (214), and subsequently configures the secondary component carrier. The base station 120 then activates the secondary component carrier, and the user device 110 receives activation information for the secondary component carrier (216), and activates the secondary component carrier.

Once a configured and activated secondary component carrier has been determined, the user device 110 begins to receive at least a portion of the data or control transmissions over the secondary component carrier, while maintaining connectivity over the primary component carrier (218). For example, the base station 120 may begin to allocate resources on the secondary component carrier for the at least a portion of the data or control transmissions of the primary component carrier. In one or more implementations, one or more control information items, such as broadcast system information, cross carrier scheduling in the downlink, and feedback information for uplink data, may be coded conservatively enough to tolerate the interference on the primary component carrier, e.g. the control information may still be decoded in the presence of the interference. Accordingly, if one or more control information items can be properly decoded in the presence of the interference, the one or more control information items may continue to be transmitted over the primary component carrier, e.g. the one or more control information items may not be moved to the secondary component carrier.

In one or more implementations, the user device 110 may maintain connectivity with the base station 120 over the primary component carrier by continuing to transmit and/or receive at least a portion of the data or control transmissions over the primary component carrier, and/or by maintaining the RRC connection over the primary component carrier. Alternatively, or in addition, the user device 110 may maintain connectivity with the base station 120 over the primary component carrier by leaving the primary component carrier activated without transmitting or receiving any data transmissions over the primary component carrier, or the user device 110 may deactivate the primary component carrier but leave the primary component carrier configured. Accordingly, the at least a portion of the control and data transmissions may be quickly moved from the secondary component carrier back to the primary component carrier when the interference ceases or diminishes.

The user device 110 determines whether the interference that was being experienced, and/or caused, by the primary component carrier has diminished (220). For example, the user device 110 may measure one or more signal metrics in relation to the primary component carrier to determine that the interference diminished, and/or the user device 110 may receive an indication from a collocated radio that the interference has diminished. If the user device 110 determines that the interference has not diminished (220), the user device 110 continues to receive at least a portion of the data or control transmissions over the secondary component carrier, while maintaining connectivity over the primary component carrier (218).

If the user device 110 determines that the interference has diminished (220), the user device 110 transmits a message to the base station 120 that indicates that the interference has diminished (222). In one or more implementations, the message may indicate that the interference has ceased or diminished, the message may indicate a time when the user device 110 estimates that the interference will cease or diminish, and/or the message may include any other information that may assist the base station 120 in determining when to return the at least the portion of the data and control transmissions to the primary component carrier.

The base station 120 then moves the at least the portion of the data and control transmissions from the secondary component carrier back to the primary component carrier, and the user device 110 begins to receive the data and control transmissions on the primary component carrier (224). For example, the base station 120 may begin to allocate resources back over the primary component carrier for the at least a portion of the data or control transmissions that were being transmitted over the secondary component carrier. In one or more implementations, the user device 110 may receive information from the base station 120 indicating that the secondary component carrier is being deactivated, and the user device 110 may deactivate the secondary component carrier.

For explanatory purposes, the example process 200 is discussed herein in the example context of moving at least a portion of data and control transmissions from a primary component carrier to a secondary component carrier when the primary component carrier is experiencing, and/or causing, interference. However, the example process 200 may also be used to move at least a portion of data and/or control transmissions from a secondary component carrier that is experiencing interference to the primary component carrier or another secondary component carrier.

Figure 3:
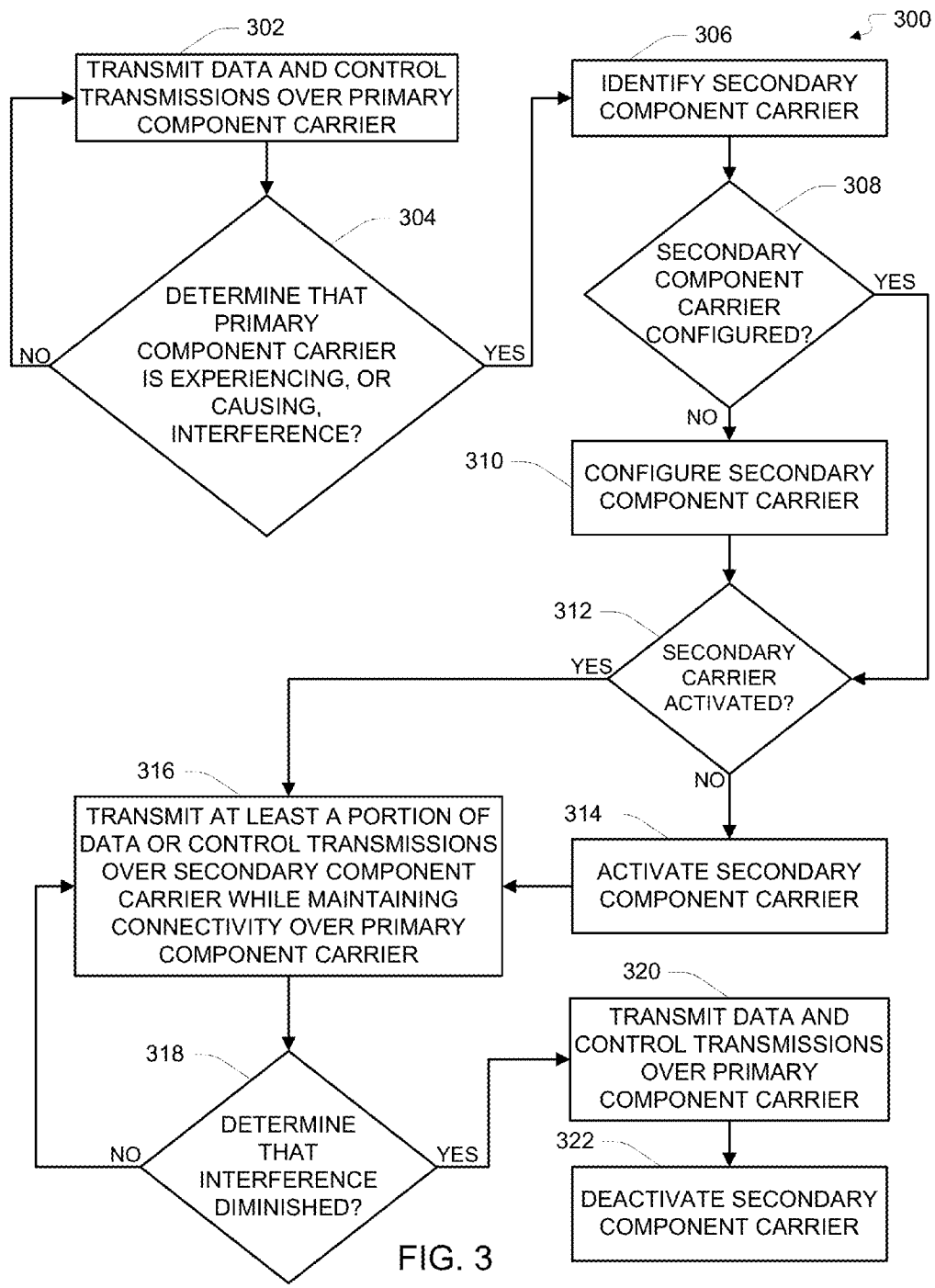
FIG. 3 illustrates a flow diagram of an example process of a base station in a system for interference mitigation through carrier aggregation in accordance with one or more implementations.

FIG. 3 illustrates a flow diagram of an example process 300 of a base station 120 in a system for interference mitigation through carrier aggregation in accordance with one or more implementations. For explanatory purposes, example process 300 is described herein with reference to the base station 120 of the example network environment 100 of FIG. 1; however, example process 300 is not limited to the base station 120 of the example network environment 100 of FIG. 1, and the example process 300 may be performed by one or more components of the base station 120, such as a host processor and/or a radio module. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

The base station 120 transmits data and control transmissions to the user device 110 over a primary component carrier (302). The base station 120 determines whether the primary component carrier is experiencing, and/or causing, interference (304). For example, the base station 120 may receive a message from the user device 110 that indicates that the primary component carrier is experiencing, and/or causing, interference. In one or more implementations, the base station 120 may be, or may be a part of, a femtocell, and the uplink data transmissions received by the base station 120 from the user device 110 may experience interference from a proximal Wi-Fi access point, such as the electronic device 140. The base station 120 may identify the interference being caused by the femtocell by determining one or more signal quality metrics with respect to the received data transmissions.

If the base station 120 does not determine that the primary component carrier is experiencing, and/or causing, interference, the base station 120 continues to transmit data and control transmissions over the primary component carrier. If the base station 120 determines that the primary component carrier is experiencing, and/or causing, interference (304), the base station identifies an appropriate secondary component carrier to which at least a portion of the data or control transmissions can be moved (306). In one or more implementations, the base station 120 may determine an uplink and/or downlink secondary component carrier, depending upon whether the determined interference corresponds to the uplink and/or downlink.

If the base station 120 determines that there are no suitable configured secondary component carriers (308), the base station 120 configures a secondary component carrier (310). If the base station configured a secondary component carrier, and/or determines that there are no suitable activated secondary component carriers (312), the base station 120 activates the secondary component carrier (314). The base station 120 then transmits at least a portion of the data or control transmissions to the user device 110 over the secondary component carrier, while maintaining connectivity with the user device 110 over the primary component carrier (316).

The base station 120 determines whether the interference has diminished (318). For example, the base station 120 may receive an indication from the user device 110 that the interference has diminished, or the base station 120 may determine that the interference has diminished through one or more measured signal quality metrics for the primary component carrier. If the base station 120 determines that the interference has diminished (318), the base station moves the at least the portion of the data and control transmissions from the secondary component carrier back to the primary component carrier (320). If the secondary component carrier is no longer needed for other transmissions, the base station 120 deactivates the secondary component carrier (322).

For explanatory purposes, the example process 300 is discussed herein in the example context of moving at least a portion of data and control transmissions from a primary component carrier to a secondary component carrier when the primary component carrier is experiencing, and/or causing, interference. However, the example process 300 may also be used to move at least a portion of data and/or control transmissions from a secondary component carrier that is experiencing interference to the primary component carrier or another secondary component carrier.

Figure 4:
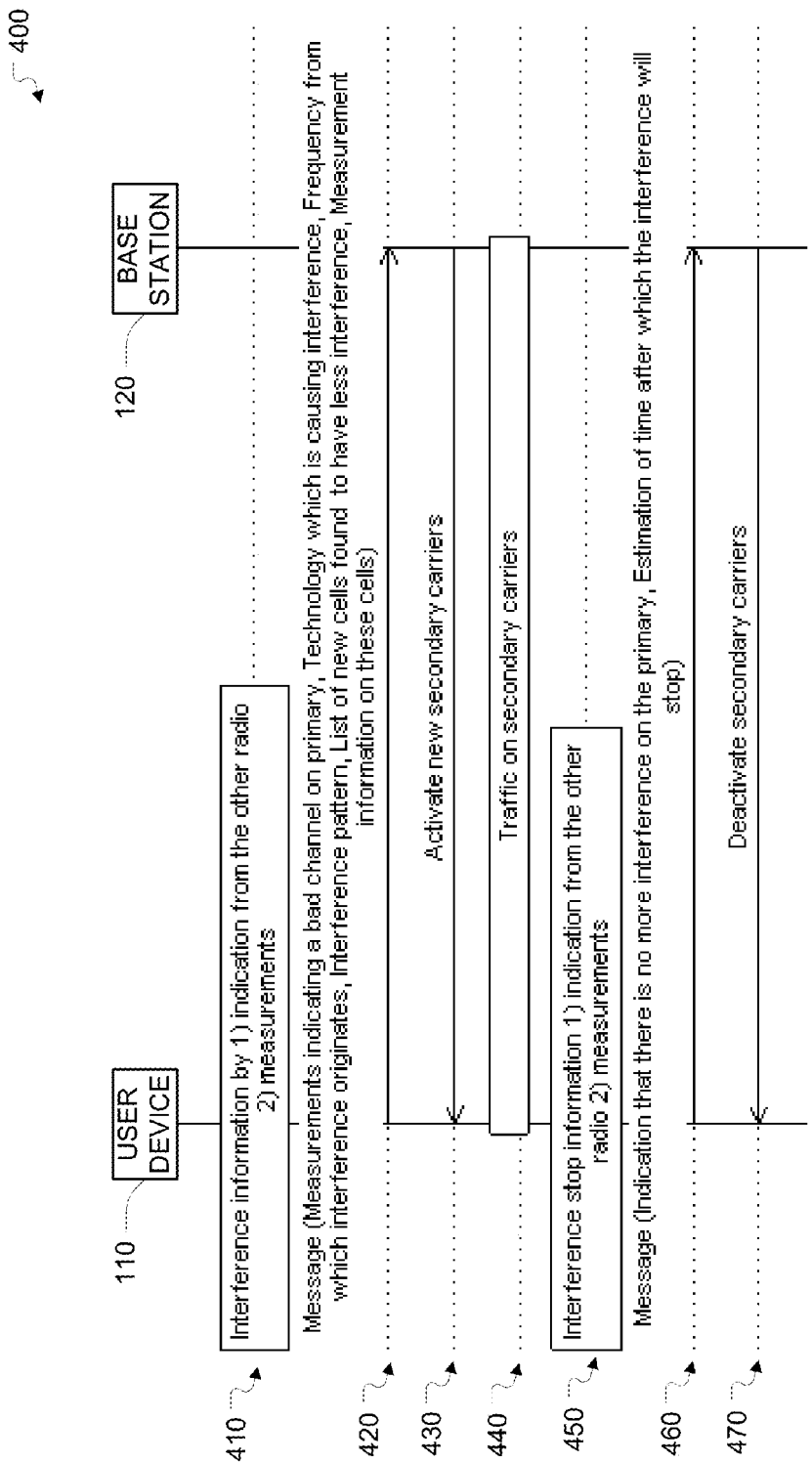
FIG. 4 illustrates an example flow diagram of an example process for a system for interference mitigation through carrier aggregation in accordance with one or more implementations.

FIG. 4 illustrates an example flow diagram of an example process 400 for a system for interference mitigation through carrier aggregation in accordance with one or more implementations. For explanatory purposes, example process 400 is described herein with reference to the user device 110 and base station 120 of the example network environment 100 of FIG. 1; however, example process 400 is not limited to the example network environment 100 of FIG. 1, and the example process 400 may be performed by one or more components of the user device 110 and/or base station 120, such as host processors, radio modules, etc. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The user device 110 determines interference information for the primary component carrier (410), e.g. by receiving an indication from a collocated radio or by determining one or more signal quality metrics for the primary component carrier. The user device 110 transmits a message to the base station 120 that indicates the interference being experienced by, and/or caused by, the primary component carrier (420). The message may include, e.g., measurements indicating a bad channel on the primary component carrier, an indication of the technology that is causing the interference, a frequency from which the interference originates, an interference pattern, a list of secondary component carriers found to have less interference (if any), a list of cells found to have less interference, and/or measurement information for the cells.

The base station 120 activates one or more new secondary component carriers and transmits information regarding the same to the user device 110 (430). The user device 110 and the base station 120 transmit and/or receive at least a portion of the data and control transmissions on the secondary component carrier (440). The user device 110 determines that the interference has diminished or ceased (450). For example, a collocated radio may indicate that the interference has ceased or diminished, or the user device 110 may determine that the interference has ceased or diminished by determining signal quality metrics for the primary component carrier. The user device 110 transmits a message to the base station 120 that indicates that the interference has ceased or diminished (460). In one or more implementations, the message may further include a time when the user device 110 estimates that the interference will cease or diminish. The base station 120 deactivates the one or more secondary component carriers and transmits information indicating the same to the user device 110 (470).

For explanatory purposes, the example process 400 is discussed herein in the example context of moving at least a portion of data and control transmissions from a primary component carrier to a secondary component carrier when the primary component carrier is experiencing, and/or causing, interference. However, the example process 400 may also be used to move at least a portion of data and/or control transmissions from a secondary component carrier that is experiencing interference to the primary component carrier or another secondary component carrier.

Figure 5:
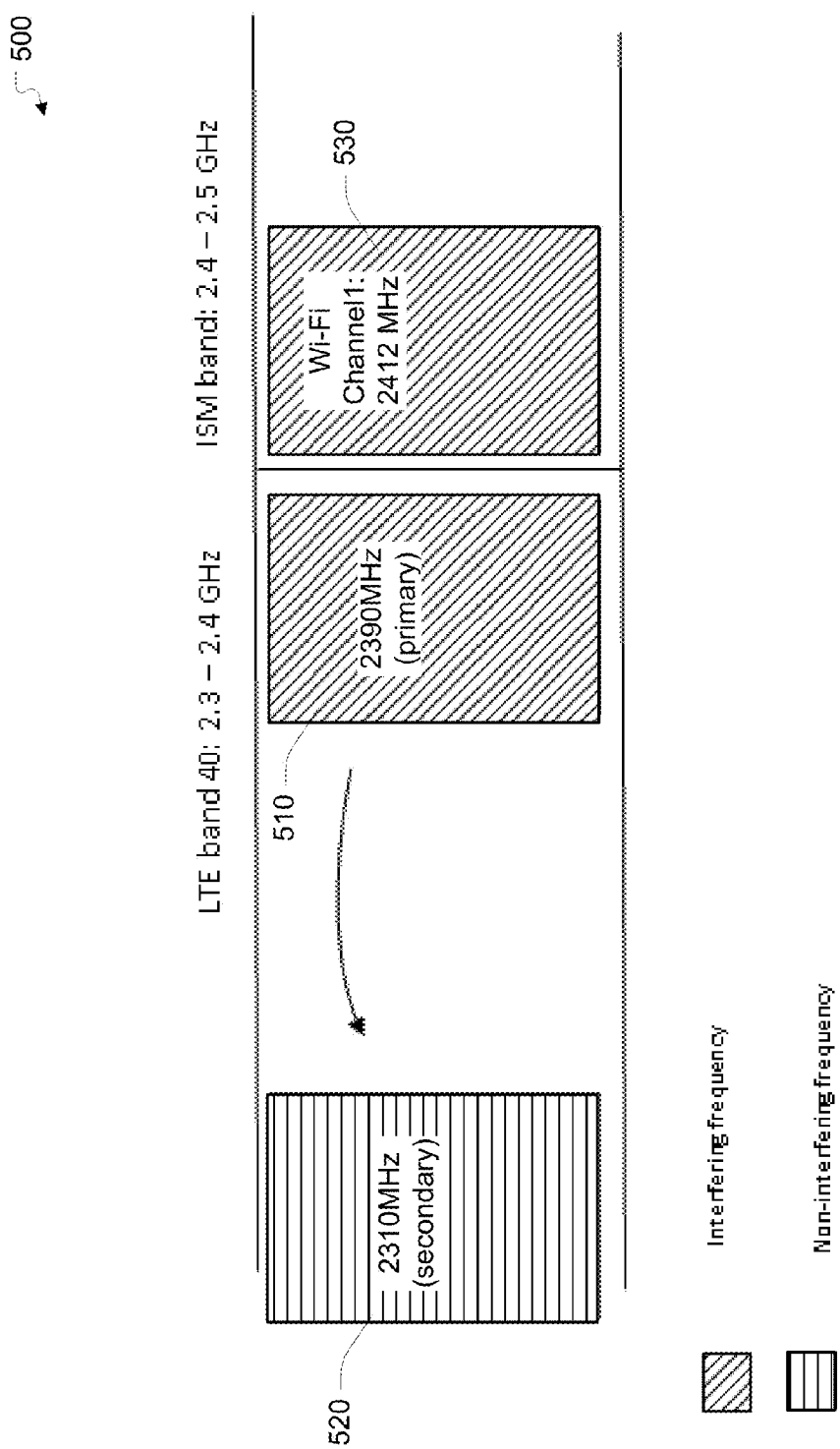
FIG. 5 illustrates an example frequency allocation for a user device in a system for interference mitigation through carrier aggregation in accordance with one or more implementations.

FIG. 5 illustrates an example frequency allocation 500 for a user device 110 in a system for interference mitigation through carrier aggregation in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example frequency allocation 500 for the user device 110 includes a frequency allocated to a primary component carrier 510, a frequency allocated to a secondary component carrier 520, and a frequency allocated to a Wi-Fi channel 530. As shown in FIG. 5, the frequency allocated to the primary component carrier 510, e.g. 2390 MHz, neighbors the frequency allocated to the Wi-Fi channel 530, e.g. 2412 MHz. Thus, if the user device 110 is communicating with the electronic device 140 over the Wi-Fi channel 530, while concurrently communicating with the base station 120 over the primary component carrier 510, the transmissions over the Wi-Fi channel 530 and the primary component carrier 510 may interfere with each other. However, as shown in FIG. 5, the frequency of the secondary component carrier 520 does not neighbor the Wi-Fi channel 530. Thus, the interference between the primary component carrier 510 and the Wi-Fi channel 530 can be mitigated by moving at least a portion of the data or control transmissions from the primary component carrier 510 to the secondary component carrier 520, as discussed further above with respect to FIGS. 2-4.

Figure 6:
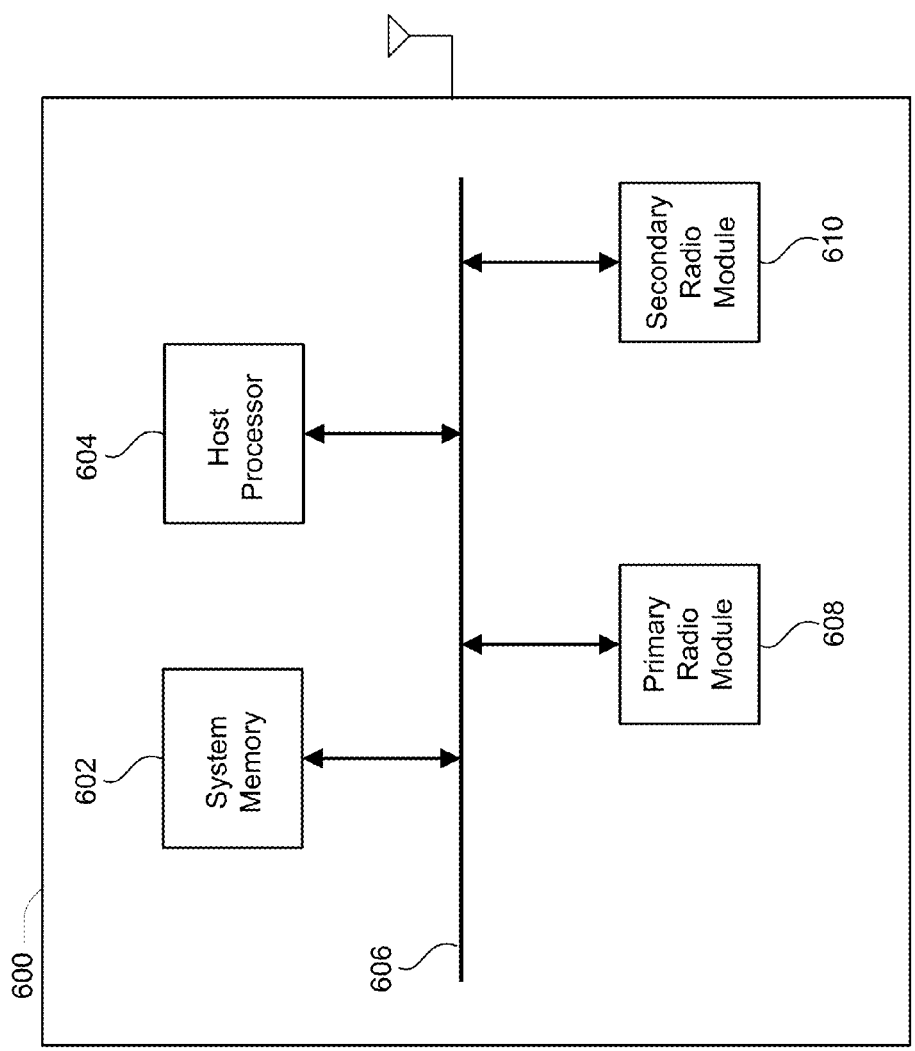
FIG. 6 conceptually illustrates an electronic system with which one or more implementations of the subject technology may be implemented.

FIG. 6 conceptually illustrates an electronic system 600 with which any implementations of the subject technology may be implemented. The electronic system 600 may be, or may be a part of, the user device 110, the base station 120, the electronic devices 130, 140, and/or generally any electronic device that transmits wireless signals. The electronic system 600 includes system memory 602, one or more host processors 604, a primary radio module 608, and a secondary radio module 610, or subsets and variations thereof. For example, the electronic system 600 may include additional radio modules. Alternatively, or in addition, the user device 110, the base station 120, or any of the electronic devices 130, 140 may include one or more of the components of the electronic system 600.

The bus 606 collectively represents all system, peripheral, and chipset buses that communicatively connect the numerous internal devices of the electronic system 600. Although the bus 606 is illustrated as a single line, the bus 606 may include multiple discrete connections, such as direct connections, between one or more of the system memory 602, the one or more host processors 604, the primary radio module 608, and/or the secondary radio module 610. In one or more implementations, the bus 606 communicatively connects the one or more host processors 604 with the system memory 602. The one or more host processors 604 can be a single processor or a multi-core processor in different implementations. Alternatively, or in addition, the one or more host processors 604 may be implemented in logic. The system memory 602 may be a read-and-write memory device. The system memory 602 may be, and/or may include, a volatile read-and-write memory, such as random access memory, or a non-volatile read-and-write memory, such as a permanent storage device. The system memory 602 stores any of the instructions and/or data that the one or more host processors 604 needs at runtime. In one or more implementations, the processes of the subject disclosure are stored in the system memory 602. From these various memory units, the one or more host processors 604 retrieves instructions to execute and data to process in order to execute the processes of one or more implementations.

The primary radio module 608 and the secondary radio module 610 may enable the electronic system 600 to communicate wirelessly using one or more wireless standards or specifications. For example, the primary radio module 608 may be a cellular radio module, such as an LTE radio module, and may enable the electronic system 600 to communicate with, e.g., the user device 110 and/or the base station 120 via cellular communications. The secondary radio module 610 may be a radio module for communicating using another communication specification, such as Bluetooth and/or Wi-Fi. For example, the secondary radio module 610 may enable the electronic system 600 to communicate with, e.g. the electronic device 130 over Bluetooth and/or the electronic device 140 over Wi-Fi. In one or more implementations, the bus 606 may include a direct connection between the primary radio module 608 and the secondary radio module 610. For example the radio modules 608, 610 may transmit messages to one another over the direct connection to indicate when the radio modules 608, 610 are interfering with each other.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for mitigating interference through carrier aggregation, the method comprising:
    transmitting data and control information over a primary component carrier to a wireless device;
    receiving, from the wireless device, a first message that indicates interference on the primary component carrier, wherein the first message comprises at least one of first measurement information indicating the interference on the primary component carrier, technology information identifying a technology which is causing or receiving the interference, an originating frequency from which the interference originates, a frequency to which the interference is caused, an interference pattern, a list of new cells having less interference than the primary component carrier, or second measurement information for the new cells; and
    in response to the first message, transmitting at least a portion of the data and control information to the wireless device over a secondary component carrier that is in carrier aggregation with the primary component carrier while maintaining connectivity with the wireless device over the primary component carrier.

2. The method of claim 1, further comprising:
    activating the secondary component carrier in response to receiving the first message.

3. The method of claim 2, further comprising:
    configuring the secondary component carrier prior to activating the secondary component carrier.

4. The method of claim 1, further comprising:
    receiving, from the wireless device, a second message that indicates that the interference on the primary component carrier has diminished; and transmitting the data and the control information over the primary component carrier in response to receiving the second message that indicates that the interference on the primary component carrier has diminished.

5. The method of claim 4, further comprising:
deactivating the secondary component carrier in response to receiving the second message that indicates that the interference on the primary component carrier has diminished.

6. The method of claim 1, wherein the maintaining the connectivity with the wireless device over the primary component carrier further comprises:
maintaining a connection with the wireless device when no information is transmitted on the primary component carrier.

7. The method of claim 1, wherein the maintaining the connectivity with the wireless device over the primary component carrier further comprises:
maintaining a physical control channel over the primary component carrier with the wireless device.

8. The method of claim 1, wherein the primary component carrier and the secondary component carrier comprise contiguous frequency bands or non-contiguous frequency bands.

9. The method of claim 1, wherein the first message further comprises the first measurement information indicating the interference on the primary component carrier.

10. The method of claim 1, further comprising:
selecting the secondary component carrier based at least in part on the first message.

11. A non-transitory machine readable medium embodying instructions that, when executed by a machine, cause the machine to perform a method for mitigating interference through carrier aggregation, the method comprising:
receiving data transmissions and control transmissions over a primary component carrier from a base station;
determining that the primary component carrier is experiencing, or causing, interference;
transmitting a first message to the base station that indicates the interference with respect to the primary component carrier;
receiving at least a portion of the data transmissions or at least a portion of the control transmissions over a secondary component carrier from the base station while maintaining a connection with the base station over the primary component carrier;
determining that the interference has diminished and transmitting, to the base station, a second message that indicates that the interference has diminished; and
receiving the data transmissions and the control transmissions from the base station over the primary component carrier.

12. The non-transitory machine readable medium of claim 11, wherein maintaining the connection with the base station over the primary component carrier comprises:
maintaining a radio resource control connection with the base station over the primary component carrier.

13. The non-transitory machine readable medium of claim 11, wherein the method further comprises:
receiving activation information for a secondary component carrier from the base station; and
activating the secondary component carrier in response to receiving the activation information.

14. The non-transitory machine readable medium of claim 11, wherein the determining that the primary component carrier is experiencing, or causing, interference comprises:
receiving information from a collocated radio that indicates that the primary component carrier is causing interference with respect to receptions of the collocated radio.

15. The non-transitory machine readable medium of claim 11, wherein the determining that the primary component carrier is experiencing, or causing, interference comprises:
measuring the interference on the primary component carrier.

16. The non-transitory machine readable medium of claim 11, wherein the method further comprises:
determining that the secondary component carrier is experiencing less interference than the primary component carrier; and
transmitting an identifier of the secondary component carrier with the first message to the base station.

17. A system, comprising:
one or more processors; and
a memory including instructions that, when executed by the one or more processors, cause the one or more processors to:
provide data transmissions and control transmissions to a wireless device over a primary component carrier;
determine that interference exists on the primary component carrier;
switch at least a portion of the data transmissions or at least a portion of the control transmissions to a secondary component carrier in response to determining that the interference exists on the primary component carrier, while maintaining connectivity on the primary component carrier; and
switch the at least the portion of the data transmissions or the at least the portion of the control transmissions to the primary component carrier in response to determining that the interference on the primary component carrier has diminished.

18. The system of claim 17, wherein the instructions, when executed by the one or more processors, further cause the one or more processors to:
deactivate the secondary component carrier upon switching the at least the portion of the data transmissions or the at least the portion of the control transmissions to the primary component carrier.

19. The system of claim 17, wherein the instructions, when executed by the one or more processors, further cause the one or more processors to:
receive a message from the wireless device related to the interference on the primary component carrier; and
determine that the interference exists on the primary component carrier based at least in part on the message.

20. The system of claim 17, wherein the instructions, when executed by the one or more processors, further cause the one or more processors to:
maintain a physical control channel over the primary component carrier with the wireless device to maintain the connectivity on the primary component carrier.

21. The method of claim 1, wherein the first message further comprises the technology information identifying the technology which is causing or receiving the interference.

22. The method of claim 1, wherein the first message further comprises the originating frequency from which the interference originates.

23. The method of claim 1, wherein the first message further comprises the frequency to which the interference is caused.

24. The method of claim 1, wherein the first message further comprises the interference pattern.

25. The method of claim 1, wherein the first message further comprises the list of new cells having less interference than the primary component carrier.

26. The method of claim 1, wherein the first message further comprises the second measurement information for the new cells.

* * * * *